(No Model.)
H. ISACKSON.
NUT LOCK.
No. 550,975. Patented Dec. 10, 1895.
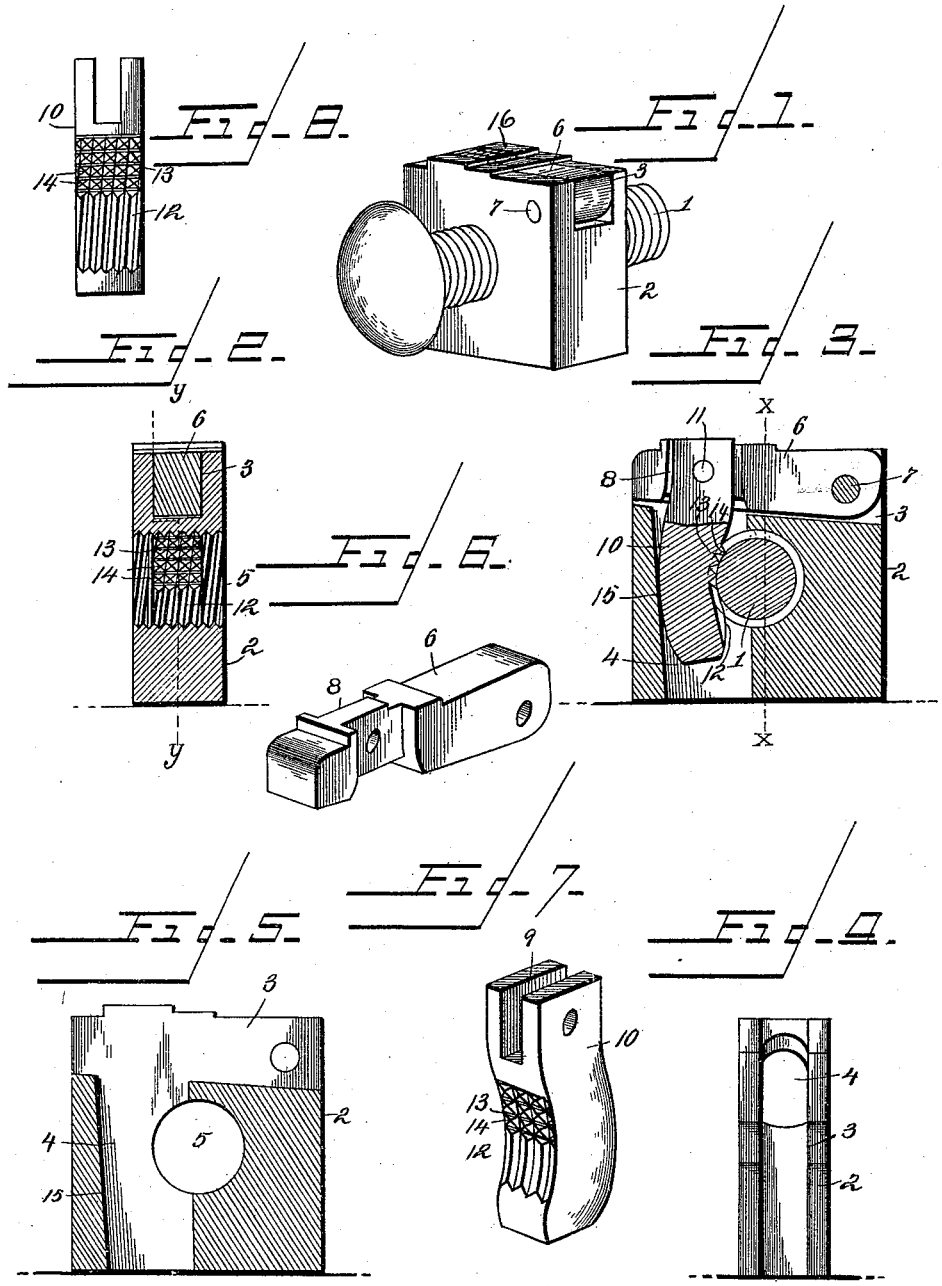
Witnesses
J. W. Riley
V. B. Hillyard
Inventor
Herman Isackson.
By his Attorneys,
C. A. Snow & Co.

UNITED STATES PATENT OFFICE.

HERMAN ISACKSON, OF HOLMES CITY, MINNESOTA.

NUT-LOCK.

SPECIFICATION forming part of Letters Patent No. 550,975, dated December 10, 1895.

Application filed September 12, 1895. Serial No. 562,328. (No model.)

*To all whom it may concern:*

Be it known that I, HERMAN ISACKSON, a citizen of the United States, residing at Holmes City, in the county of Douglas and State of Minnesota, have invented a new and useful Nut-Lock, of which the following is a specification.

My invention aims to provide an improved nut-lock in which the nut will present the ordinary appearance and which will obviate the use of locking-washers and other external means for securing the nut upon the bolt, as heretofore commonly practiced, thereby providing a device which will combine simplicity and durability and which will be capable of use in any place where bolts are required.

The improvement consists, essentially, of an arm pivoted in a channel or groove provided in one edge of the nut and a bar operating in a passage intersecting the said groove and the threaded bolt-opening and pivoted at one end to the said arm, the side of the bar facing the threaded bolt-opening being provided with thread-sections to correspond and form a continuation of the threads of the said threaded bolt-opening, said bar being constructed to be driven inward by a smart blow, so as to crowd the thread-sections into the threads of the bolt, thereby securing the nut in the located position.

The improvement further consists of the novel features which hereinafter will be more fully set forth, and recited in the claims, and which are shown in the accompanying drawings, in which—

Figure 1 is a perspective view of a nut and bolt lock constructed in accordance with and embodying the essence of my invention. Fig. 2 is a cross-section on the line X X of Fig. 3, the bolt being removed, looking to the left. Fig. 3 is a section on the line Y Y of Fig. 2, the bolt being shown in cross-section and a portion of the locking-bar being broken away. Fig. 4 is an edge view of the nut, the pivoted arm and locking-bar being removed. Fig. 5 is a section of the nut similar to Fig. 3, the bolt, the pivoted arm, and the locking-bar being removed. Fig. 6 is a detail view of the pivoted arm. Fig. 7 is a detail view of the locking-bar; and Fig. 8 is a plan view of the same, viewed from the face, provided with the thread-sections.

The numeral 1 represents a bolt of the usual construction, and 2 is the nut provided with my improvements. A groove or channel 3 is provided in one edge of the nut, which is intersected by a passage 4, extending through the nut in a direction approximately at right angles to the groove 3. This passage 4 opens out through that edge of the nut opposite to the grooved edge 3 and intersects with the threaded bolt-opening 5. An arm 6 is located in the groove 3 and is pivoted at one end therein by means of the pin 7, and its sides are notched near the free end, as shown at 8, to receive the bifurcations of the cleft end of the locking-bar 10, said bifurcations 9 coming flush with the sides of the arm 6. A pin 11 pivotally connects the locking-bar 10 and the pivoted arm 6.

The locking-bar 10 is slightly concaved on the face adjacent to the bolt-opening 5, and this face is provided with thread-sections 12, which correspond in pitch with the thread of the said bolt-opening 5, of which they form a continuation. A series of transverse grooves 13 intersect the thread-sections 12 for a short distance from the pivotal end of the locking-bar 10, so as to provide a series of points 14, for a purpose hereinafter to be more fully explained. The thread-sections near the free end of the locking-bar remain intact, so as to present an extended bearing for the thread of the bolt 1 in the operation of tightening and loosening the same. The outer wall 15, of the passage 4 inclines slightly from the groove 3 to the opposite edge of the nut, so that when pressing the locking-bar 10 inward the inclined wall 15 will at the same time advance the locking-bar toward the bolt-opening 5 and crowd the thread-sections 12 against the thread of the bolt 1 and lock the nut and bolt in the located position. As the locking-bar is moved inward, the said points 14 of the thread-sections are wedged into the threads of the bolt and firmly lock the latter. The points 14 result in a much better binding action than can possibly be obtained by having the thread-sections 12 continuous throughout their length.

When screwing or unscrewing the nut upon the bolt 1, the locking-bar 10 is moved outward a sufficient distance to admit of the free movement of the nut upon the bolt. After the nut has been screwed home the locking-bar 10 is forced within the passage 4, preferably by striking it a smart blow with a hammer upon the outer end. This crowds the thread-sections into and against the threads of the bolt and the desired result is effected.

When it is required to remove the nut, a suitable instrument is inserted into the end of the passage 4 opposite the groove 3 and is struck a sharp blow, so as to release the locking-bar from engagement with the bolt. The pivoted arm 6 is widened at a point opposite the end of the locking-bar 10 to provide sufficient metal for the pivot 11, and in order to protect said widened portion the edge of the nut has an outer extension 16. Obviously this outer extension 16 and the corresponding widened portion of the pivoted arm may be dispensed with and are not essential to the efficiency of the invention.

Having thus described the invention, what is claimed as new is—

1. In a nut and bolt lock, the combination with a bolt, of a nut having a groove in one edge and a passage extending at right angles to the groove and intersecting therewith and with the bolt opening, an arm pivoted at one end in the said groove, and a locking bar having pivotal connection with the opposite end of the said arm and located in the aforesaid passage, and having thread sections on the face, or side, adjacent to the bolt opening, said thread sections being adapted to be crowded against the threaded portion of the bolt by a longitudinal movement of the locking bar, substantially as set forth.

2. The combination with a bolt, of a nut having a groove in one edge and a passage intersecting with the said groove and the bolt opening, an arm pivoted in the groove, and a locking bar operating in the said passage and having pivotal connection with the said arm, the face, or side, of the locking bar adjacent to the bolt opening being provided with thread sections, which are intersected for a short distance from one end by transverse grooves, substantially as described for the purpose specified.

3. The herein shown and described nut and bolt lock, comprising a bolt, a nut having a groove in one edge and a passage extending approximately at right angles to the said groove and intersecting with the latter and with the bolt opening, the outer wall of the said passage being inclined throughout its length, an arm located in the said groove and pivoted at one end therein, and having corresponding notches in its sides near the free end, and a locking bar located and operating in the said passage and having one end cleft and fitted in the notches of the said arm, to which latter it is pivoted, the face, or side, of the locking bar adjacent to the bolt opening being concave and provided with thread sections, which latter are intersected by transverse grooves for a short distance from one end so as to provide a series of points, said locking bar being engaged with the bolt by being struck a smart blow on its pivotal end and released by being struck on the opposite end by an instrument inserted in the said passage, substantially as set forth.

In testimony that I claim the foregoing as my own I have hereto affixed my signature in the presence of two witnesses.

HERMAN ISACKSON.

Witnesses:
M. J. DALY,
JOHN IMPPOLA.